(12) United States Patent
Schneidmiller

(10) Patent No.: US 6,910,298 B2
(45) Date of Patent: Jun. 28, 2005

(54) INSECT TRAP

(75) Inventor: Rodney G. Schneidmiller, Greenacres, WA (US)

(73) Assignee: Sterling International Inc., Spokane, WA (US)

(*) Notice: Subject to any disclaimer, the term of this patent is extended or adjusted under 35 U.S.C. 154(b) by 0 days.

(21) Appl. No.: 10/626,817

(22) Filed: Jul. 23, 2003

(65) Prior Publication Data
US 2005/0028429 A1 Feb. 10, 2005

(51) Int. Cl.$^7$ .......................................... A01K 69/06
(52) U.S. Cl. .............................................. 43/65
(58) Field of Search .............................. 43/65, 113, 122

(56) References Cited

U.S. PATENT DOCUMENTS

| 38,277 | A | | 4/1863 | Bassett | |
|---|---|---|---|---|---|
| 149,918 | A | | 4/1874 | Clough | |
| 218,175 | A | | 8/1879 | Hollingshead | |
| 836,052 | A | | 11/1906 | Pool | |
| 862,079 | A | | 7/1907 | Lenthier | |
| 869,556 | A | * | 10/1907 | Haas | 43/113 |
| 1,231,877 | A | * | 7/1917 | Goodrum, Jr. | 43/113 |
| 1,286,423 | A | * | 12/1918 | Saffry | 43/65 |
| 1,415,801 | A | * | 5/1922 | Corle | 43/65 |
| 1,586,630 | A | * | 6/1926 | Lee et al. | 43/65 |
| 1,716,196 | A | * | 6/1929 | Swanson | 43/65 |
| 1,723,208 | A | * | 8/1929 | Michael | 43/65 |
| 1,846,851 | A | * | 2/1932 | Dodge | 43/65 |
| 2,490,180 | A | * | 12/1949 | Varnedoe, Jr. | 43/65 |
| 2,608,022 | A | * | 8/1952 | Wright | 43/112 |
| 3,059,373 | A | | 10/1962 | Gardner | |
| 3,271,894 | A | * | 9/1966 | Manno et al. | 43/65 |
| 3,320,692 | A | * | 5/1967 | Hellen | 43/65 |
| 3,820,273 | A | * | 6/1974 | Novak | 43/113 |
| 3,885,341 | A | | 5/1975 | Kuchenbecker et al. | |
| 4,044,494 | A | | 8/1977 | Grajnert | |
| 4,107,867 | A | * | 8/1978 | Kennedy | 43/65 |
| 4,212,129 | A | * | 7/1980 | Shumate | 43/113 |
| 4,856,226 | A | * | 8/1989 | Taylor | 43/113 |
| 4,876,822 | A | | 10/1989 | White | |
| 5,090,152 | A | * | 2/1992 | Ling | 43/64 |
| 5,102,537 | A | * | 4/1992 | Jones | 210/162 |
| 5,175,958 | A | * | 1/1993 | Wedemeyer | 43/121 |
| 5,184,417 | A | * | 2/1993 | Weldon | 43/107 |
| 5,231,792 | A | * | 8/1993 | Warner | 43/122 |

(Continued)

Primary Examiner—Teri Pham Luu
Assistant Examiner—Jordan Lofdahl
(74) Attorney, Agent, or Firm—Christensen O'Connor Johnson Kindness PLLC

(57) ABSTRACT

A trap (10) for insects, vermin, and similar subjects is described. The trap includes a container (12) having a volume (26), an opening (28) into the volume, and a whisker assembly (14). The whisker assembly is located at the opening and extends into the volume, allowing subjects to enter the volume, but not exit the volume. In one embodiment, the whisker assembly includes a plurality of nonmetal flexible strands (30) arranged in a conical manner. The bases of the strands are located at the opening. The tips of the strands are located near one another. In another embodiment, the container has a top portion (20) and a bottom portion (22). The bottom portion includes the volume and the opening. A light assembly (18) is attached to the top portion, directly adjacent the opening in the bottom portion, and includes an LED that emits blue light onto the opening.

27 Claims, 5 Drawing Sheets

U.S. PATENT DOCUMENTS

| | | | |
|---|---|---|---|
| 5,274,949 A * | 1/1994 | Beaton | 43/113 |
| 5,323,556 A * | 6/1994 | Carle | 43/139 |
| 6,134,826 A * | 10/2000 | Mah | 43/112 |
| 6,158,165 A | 12/2000 | Wilson | |
| 6,161,328 A * | 12/2000 | Sing | 43/137 |
| 6,289,629 B2 | 9/2001 | Greening | |
| 6,447,206 B1 * | 9/2002 | Fleury | 405/125 |
| 6,502,347 B1 * | 1/2003 | Carver, Sr. | 43/113 |
| 6,532,695 B1 * | 3/2003 | Alvarado | 43/122 |
| 6,574,914 B2 * | 6/2003 | Smith | 43/113 |

\* cited by examiner

INSECT TRAP

FIELD OF THE INVENTION

The present invention relates to fishing, trapping, and vermin destroying; and, more particularly, to traps having an entrance so made that, once an insect is inside, it is difficult for the insect to return by that entrance.

BACKGROUND

Various traps have been devised over the years to rid an area of insect pests. Some of these traps contain poisons that are inappropriate for use around children or in gardens that are sensitive to even small amounts of pollutants. Other traps use a light to attract and then electrocute an insect. While effective, the associated sound is not pleasant, and the resulting debris must be frequently collected. U.S. Pat. No. 6,158,165 describes an insect trap that avoids both poisons and electrocution, but is for use with larger insects, such as cockroaches. The '165 device has a ring of interleaving wires surrounding an opening in a container. Insects push aside the wires in one direction to enter the container, but are prevented from escaping from the wires by going in the reverse direction. While such a device is useful for insects that are strong enough or heavy enough to push the interleaved wires apart, it is ineffective for those insects, such as moths, that are not.

Thus, a need exists for an insect trap that avoids poison and electrocution, but is effective in collecting lighter subjects, such as winged insects. The ideal device would have a one-way entrance so that, once an insect is inside, it is difficult for the insect to return by that entrance. Further, the device should be useful in catching insects that are not particularly large, strong, or heavy.

SUMMARY OF THE INVENTION

The present invention is an insect trap having a container, a whisker assembly, a light assembly, and a chemical attractant. The container defines a volume. An opening connects regions external to the trap with regions in the volume. The whisker assembly is located at the opening and includes a plurality of flexible strands that extend into the volume. In some embodiments these strands have a length in the range of about 13 mm to about 150 mm. In some embodiments these strands have an average diameter in the range of about 0.05 mm to about 2.00 mm. The light assembly includes one or more light bulbs to direct light onto the flexible strands. The chemical attractant is located within the volume. During use, the light bulb attracts and draws a subject to the trap and the chemical attractant further lures the subject into the volume. The arrangement of the whisker assembly allows the subject to enter the volume, but not to easily exit the volume. For example the trap may have a generally ovoid shape.

In accordance with aspects of this invention, there are many different variations possible in the formation of the whisker assembly. In one embodiment, the flexible strands are arranged in a conical or frustoconical manner. In another embodiment, the flexible strands are formed having multiple sections. In some embodiments the base of the strands are arranged in a noncircular pattern. There are also multiple variations possible in the flexible strands used in the whisker assembly. In preferred embodiments, the flexible strands are made of a material that is readily bent, such as a nonmetal material. In some embodiments, the flexible strands are made from a luminous material, a reflective material, or a light-conductive material. Example materials include polypropylene, Nylon, acrylic, and ethylene vinyl acetate. For example the strands can be arranged so as to focus their light to a distant point such as a distant point located along the container.

In accordance with other aspects of this invention, if using light-conductive flexible strands, the light assembly can provide a secondary light attractant at the tip ends of the strands. In addition, arrangements may be made in which the strands direct the light onto a distant surface, such as the container wall.

In accordance with further aspects of this invention, the light assembly emits a blue light that is particularly useful for trapping moths. The light assembly may also include an optional photosensitive device arranged to turn the assembly on and off according to whether it is daylight or night.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

The present invention is an environmentally friendly trap 10 useful for catching insects, particularly winged insects, such as moths. Various embodiments of this invention are described. In general, the most desirable configuration will depend upon the insect sought to be caught.

Figure 1:
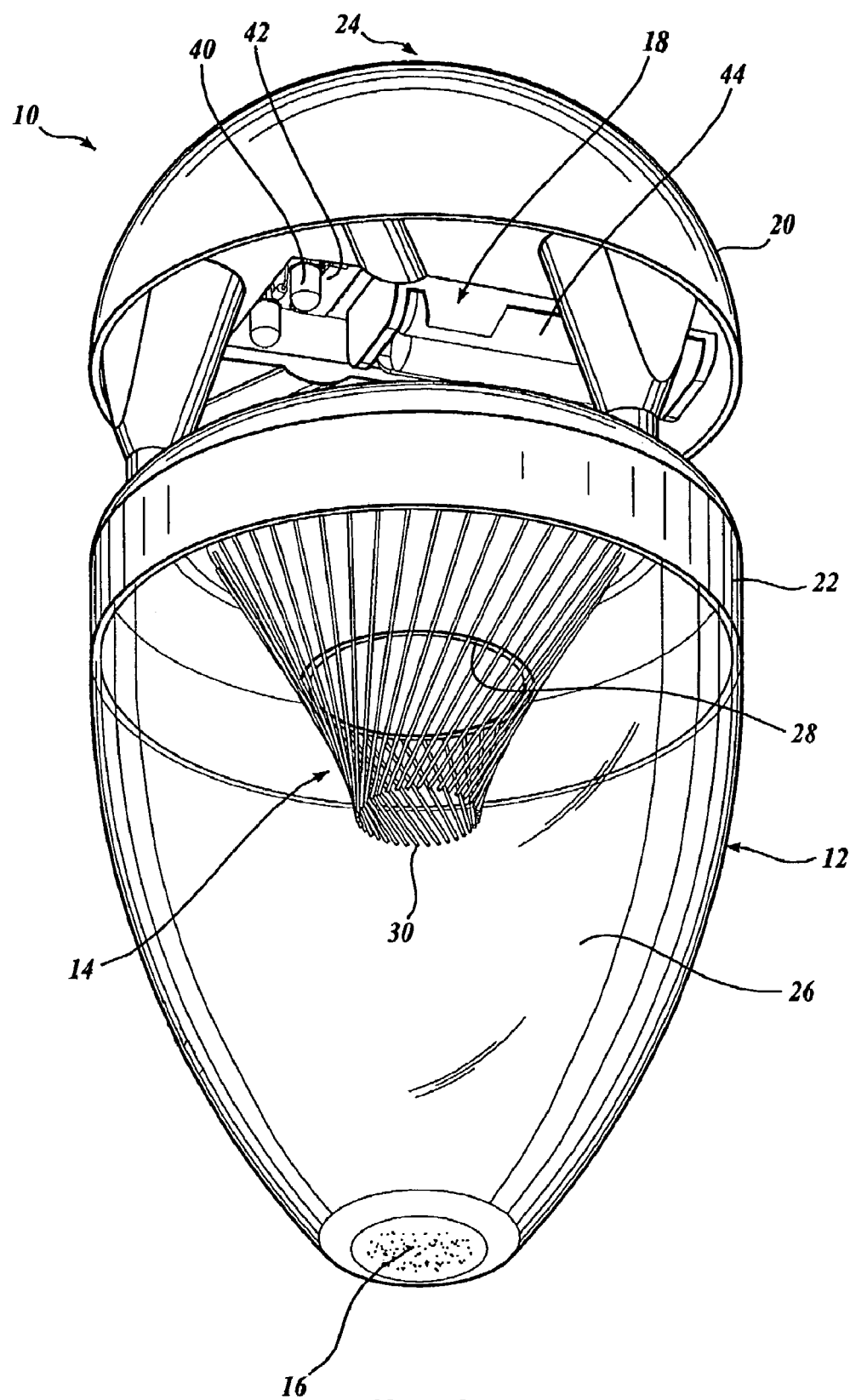
FIG. 1 is a perspective view of one embodiment of an insect trap formed in accordance with the present invention.

FIG. 1 illustrates one embodiment useful for trapping moths. The trap 10 includes a container 12, a whisker assembly 14, a conventional (chemical) attractant 16 located within the container, and a light assembly 18. The container 12 has separable top and bottom portions, 20 and 22, respectively. The top portion 20 is located at the container's upper end 24. The bottom portion 22 defines a volume 26. An opening 28 is located in the bottom portion to provide a passageway between regions that are external to the trap and regions that are internal to the volume 26.

The whisker assembly 14 is located at the opening 28 and extends into the volume 26. The primary goal of the whisker assembly is to allow subjects to enter the volume, but not exit the volume. During use, the light assembly 18 attracts an insect to the trap. Because light can travel much farther than a chemical attractant alone, the trap is effective over a wide area. Once the insect is near the trap, the insect picks up the scent of the attractant. The moth moves toward the attractant by passing through the whisker assembly 14 and into the volume 26.

Figure 2:
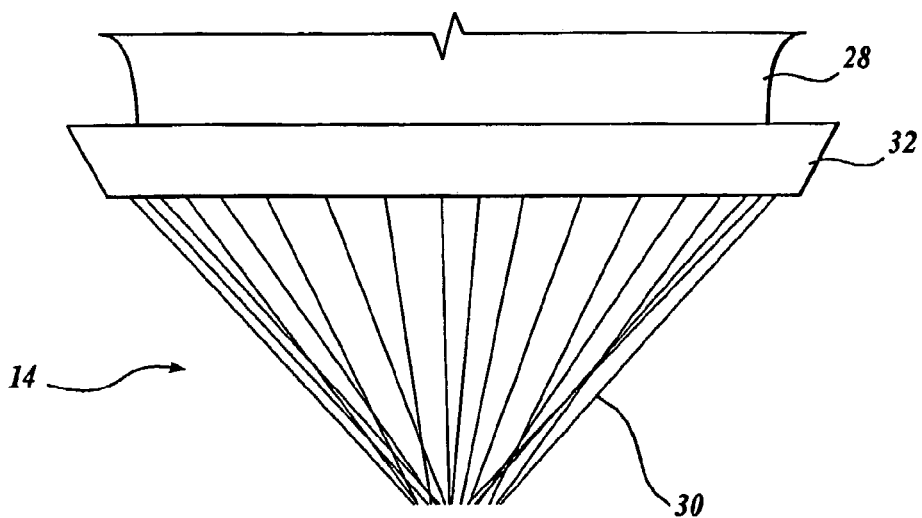
FIGS. 2 and 3 are side views of alternative embodiments of a whisker assembly formed in accordance with the present invention.
Figure 3:
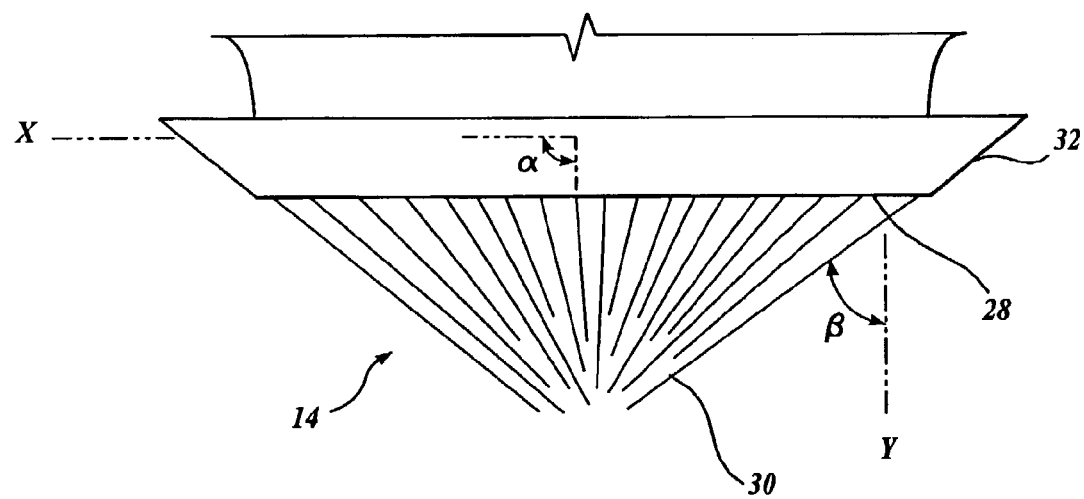
Figure 4:
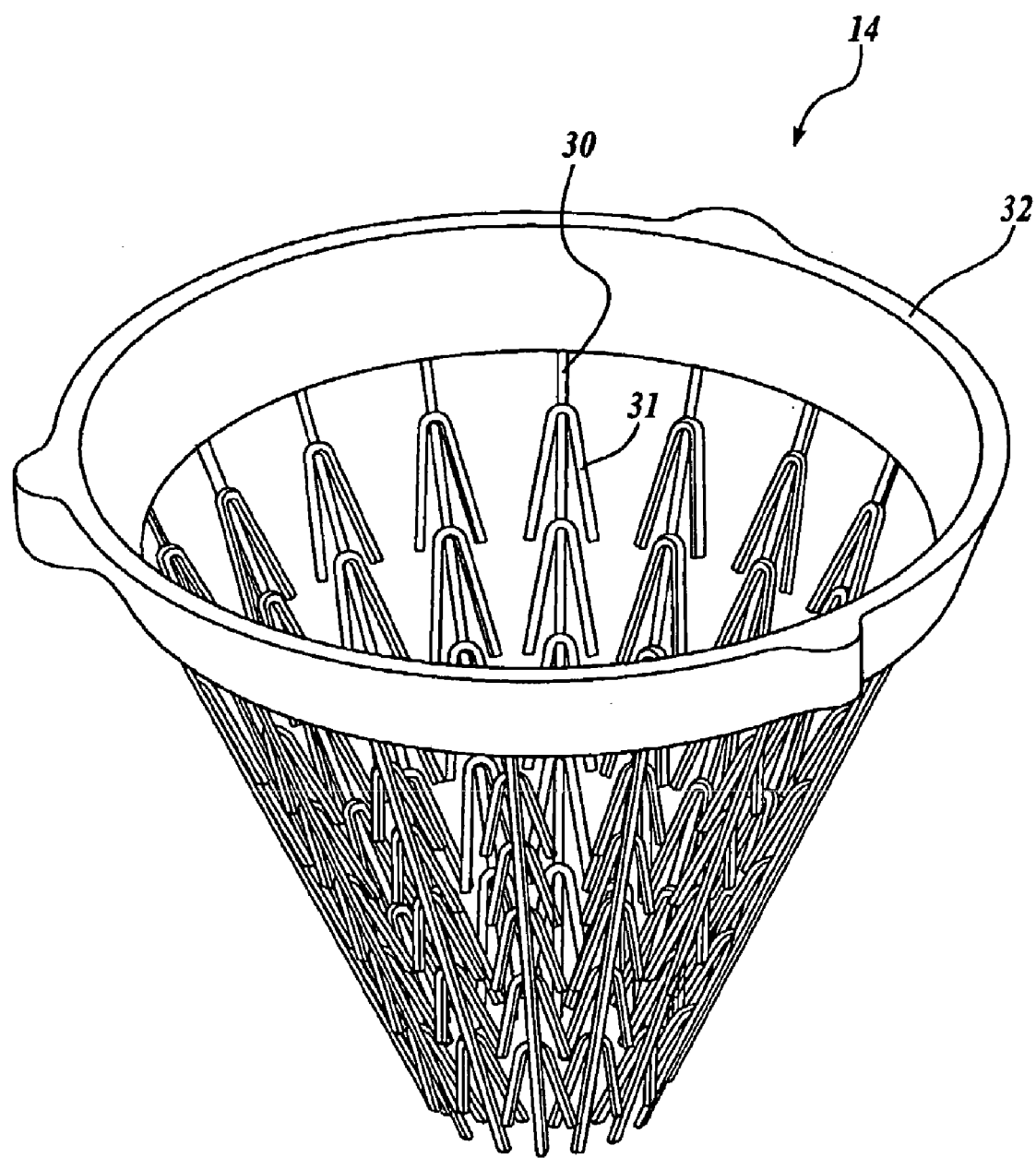
FIGS. 4 and 5 are perspective views of still further embodiments of a whisker assembly formed in accordance with the present invention.

In more detail and still referring to the embodiment of FIG. 1, the whisker assembly 14 includes a plurality of flexible strands 30 arranged in a conical manner. The placement of the tips of the strands defines a second opening having a diameter less than the wingspan of the insect. The base of the strands are connected to the container at the opening 28. In this arrangement, the flexible strands are integrally formed with the container. Alternatively, as shown in FIGS. 2–4, the bases of the stands are affixed to a ring 32 that connects to the opening 28.

Referring back to FIG. 1, the tips of the strands are located near one another, though in this arrangement, in a noncontacting relation. The strands are made of a flexible material, e.g., polypropylene, Nylon, acrylic, and ethylene vinyl acetate. The strands should be flexible enough to allow the particular desired subject to enter the volume, though stiff enough to prohibit the subject from exiting the volume. The angle of the cone will also affect the difficulty for the insect to escape. A shallower angle (see FIG. 3) will increase the chances of the strands bending inward if contacted, and hence working to keep the insect trapped. A steeper slope (see FIG. 4) will have the opposite effect. Similarly, a designer should consider the strands' ability to flex according to the trapping needs of the target insect.

Figure 5:
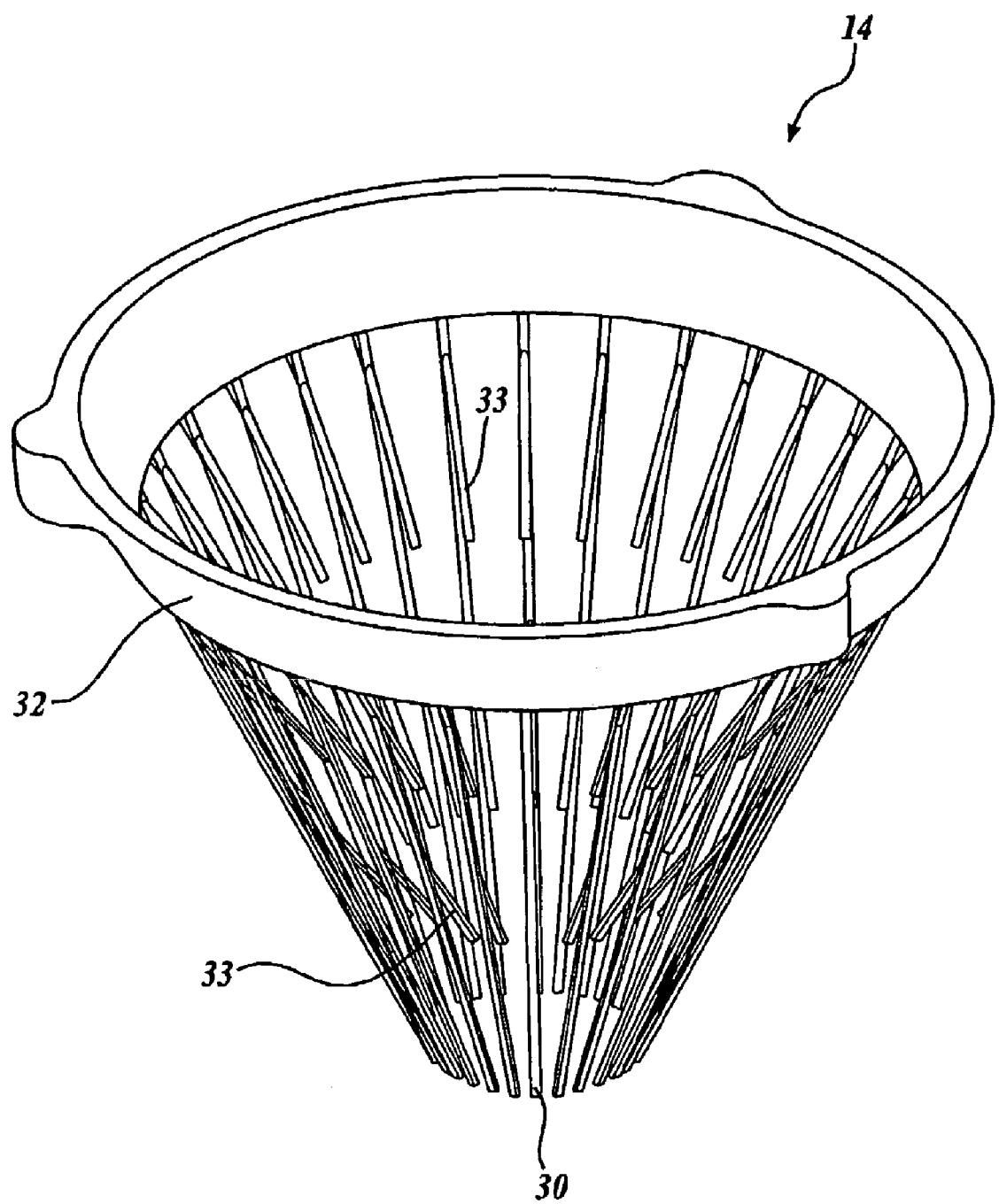

There are numerous other variations possible for the whisker assembly that may be used and tailored to a particular insect. For example, the strands may be the same length, with tip ends being spaced in a tight, circular, noncontacting path. See FIG. 1. The base of the strands could be oriented at an angle to give the strands a swirled effect. See FIG. 1. The strands may be arranged in a random, disorganized manner, with some strands contacting each other and some not. See FIG. 2. The arrangement of FIG. 3 includes strands that are of varying lengths and arranged to result in a shallow overall cone height. FIGS. 4 and 5 illustrate whisker assemblies having multisectioned strands 30. FIG. 4 has V-shaped sections 31 attached end to end along each strand. The strands of FIG. 5 have a main stem and one or more inwardly oriented arms 33. In many embodiments, the preferred shape of the plurality of flexible strands will be linear strands arranged in a conical or frustoconical configuration, but a nonconical passage of curled or kinked hair-like flexible strands could be made to work as well. In some embodiments, opening 28 in trap 10 is positioned in a first plane and strands 30 extend toward one another at an angle in the range of about 15 degrees to about 45 degrees relative to the first plane. In another embodiment, opening 28 is positioned in a first plane and strands 30 extend toward one another at an angle less than about 90 degrees relative to the first plane.

Referring back to FIG. 1, the light assembly 18 includes one or more light bulbs 40 attached to the top portion 20 of the container 12, near the opening 28. As used herein, the term "light bulb" means a device that is capable of emitting electromagnetic radiation in the visible spectrum, e.g., incandescent, LED, LCD, flame, etc. A preferred light bulb for use with moths is a low-voltage LED that emits blue light. In general, bulbs that emit light with a frequency in the range of about 380 to about 565 nanometers are of value in trapping moths. Still referring to FIG. 1, the light assembly 18 includes an optional photosensitive device 42 capable of turning the bulb off during daylight and turning the bulb on at night. A battery 44 provides electric current.

The light assembly 18 is used to lure insects that are attracted to light. In addition, the bulb may be positioned at a location that directs light into the flexible strands, thus illuminating the strands and creating an additional attractant for the moths to enter into the volume.

In one embodiment, the strands are formed from a luminous or light-reflective material. Luminous materials allow light to be partially reflected and to partially pass through the material. This gives the luminous material a soft glowing effect. A light-reflective material generally reflects all light that hits it. Alternatively, various optical effects can be created using light-conductive strands. For example, if light is directed onto the base of a fiber-optic type of strand, the light will be visible at the tip ends of the strands, further drawing the insect into the volume. The strands may also be arranged to direct or focus their light onto a distant surface, such as the distant container wall, thus providing yet another light lure for the insect. The opposite approach may be used instead, where the flexible strands are clear and not readily discernible to the insect. Thus, as will be appreciated from the various approaches possible, the flexible strands 30 can be formed from any of a number of known materials. Example strands include, but are not limited to, nylon filaments, hollow rubber tubes, polypropylene, Nylon, acrylic, and ethylene vinyl acetate, etc. In most embodiments, particularly those for use with moths, the flexible strands will be made of a nonmetal material.

Figure 6:
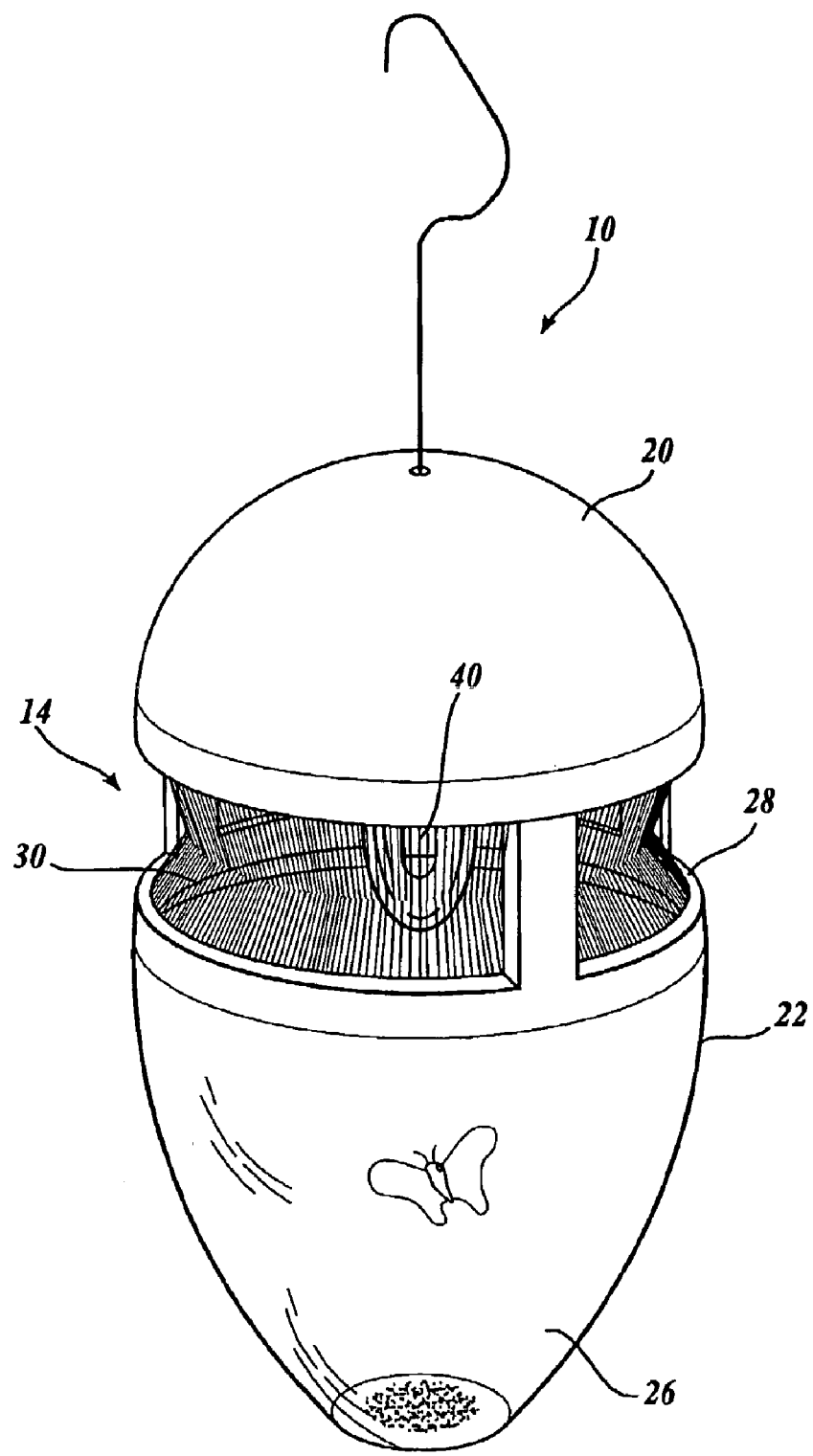
FIG. 6 is a perspective view of another embodiment of a trap formed in accordance with the present invention.

Referring to FIG. 6 is yet another embodiment of a trap formed in accordance with the present invention. In this embodiment, the light bulb is located within the volume and the whisker assembly is circumferentially located between the upper and lower portions. As will be appreciated from a reading of the above, there are many different arrangements possible, within the scope of the invention as claimed herein.

While the preferred embodiment of the invention has been illustrated and described, it will be appreciated that various changes can be made therein without departing from the spirit and scope of the invention. For example, for some insect traps, it may be helpful to use a timed attractant or a release mechanism to control the intensity of the attractant's release. Such features will in large part depend on the subject sought to be caught.

The embodiments of the invention in which an exclusive property or privilege is:

1. A trap for insects and similar subjects, the trap comprising:
   (a) a container having a volume with a first opening;
   (b) a whisker assembly located at the opening and including a plurality of flexible strands that extend into the volume;
   (c) a light assembly attached to the container, the light assembly including at least one light bulb, wherein the strands are formed from a light conductive material and the at least one light bulb is positioned at a location that directs light into the base of the flexible strands which are arranged so as to focus their light to a distant point; and
   (d) a chemical attractant located within the volume;
   wherein, during use, the light bulb attracts and draws a subject to the trap and the chemical attractant further lures the subject into the volume, the arrangement of the whisker assembly allowing the subject to enter the volume, but not easily exit the volume.

2. The trap according to claim 1, wherein the strands are formed from a luminous material.

3. The trap according to claim 1, wherein the strands are formed from a reflective material.

4. The trap according to claim 1, wherein the strands are made of a material including at least one of polypropylene, Nylon, acrylic, and ethylene vinyl acetate.

5. The trap according to claim 1, wherein the strands are strands having an average diameter in the range of about 0.05 mm to about 2.00 mm.

6. The trap according to claim 1, wherein the strands include base ends located at the first opening and tip ends located near one another, the tip ends defining a second opening that is smaller in size than the first opening.

7. The trap according to claim 1, wherein the base of the strands are arranged in a noncircular pattern.

8. The trap according to claim 1, wherein the strands are the same length, extending into the volume the same general distance relative to one another.

9. The trap according to claim 1, wherein the strands are of varying lengths so that some strands extend into the volume farther than others.

10. The trap according to claim 1, wherein the strands are of a length in the range of about 13 mm to about 150 mm.

11. The trap according to claim 1, wherein the first opening is positioned in a first plane and the strands extend toward one another at an angle in the range of about 15 degrees to about 45 degrees relative to the first plane.

12. The trap according to claim 1, wherein the first opening is positioned in a first plane and the strands extend toward one another at an angle less than about 90 degrees relative to the first plane.

13. The trap according to claim 1, wherein the strands are positioned in a swirl pattern.

14. The trap according to claim 1, wherein the distance between the tips of adjacent strands is in the range of about 1 mm to about 20 mm.

15. The trap according to claim 1, wherein the tips of adjacent strands are in a noncontacting relationship.

16. The trap according to claim 1, wherein the strands are formed having multiple sections.

17. The trap according to claim 16, wherein the strands are formed having a main stem and at least one inwardly oriented arm.

18. The trap according to claim 1, wherein the container has an upper end; the volume being disposed opposite the upper end, and the first opening being located between the upper end and the volume.

19. The trap according to claim 1, wherein the container includes separable top and bottom portions, the bottom portion including the volume.

20. The trap according to claim 1, wherein the trap has a generally ovoid shape.

21. The trap according to claim 1, wherein the at least one light bulb is located near the opening of the container within a distance of approximately 155 mm or less.

22. The trap according to claim 1, wherein light travels through the flexible stands and is visible at the tip ends of the strands.

23. The trap according to claim 1, wherein the distant point is located along the container.

24. The trap according to claim 1, wherein the at least one light bulb includes a light-emitting diode that emits light having a frequency in the range of about 380 to about 565 nanometers.

25. The trap according to claim 1, wherein the at least one light bulb includes a monochromatic light-emitting diode that emits blue light.

26. The trap according to claim 1, wherein the light assembly further includes a photosensitive device arranged to cause the at least one light bulb to illuminate during darkness and to turn off during daylight.

27. The trap of claim 1, wherein the strands are made of a non-metal material, and the at least one light bulb emits blue light.

\* \* \* \* \*